United States Patent
Legras et al.

(10) Patent No.: US 9,612,335 B2
(45) Date of Patent: Apr. 4, 2017

(54) POSITIONING DEVICE WITH COMMUNICATION MODULE AND ANTENNA

(71) Applicant: Trimble Nantes S.A.S., Carquefoux (FR)

(72) Inventors: Christian Legras, Carquefoux (FR); Bruno Lancien, Carquefoux (FR); Didier Pichon, Carquefoux (FR)

(73) Assignee: TRIMBLE NANTES S.A.S., Carquefoux (FR)

( * ) Notice: Subject to any disclaimer, the term of this patent is extended or adjusted under 35 U.S.C. 154(b) by 360 days.

(21) Appl. No.: 14/248,770

(22) Filed: Apr. 9, 2014

(65) Prior Publication Data

US 2014/0218234 A1    Aug. 7, 2014

(30) Foreign Application Priority Data

Nov. 29, 2013 (EP) .................... 13290295

(51) Int. Cl.
*G01S 19/13* (2010.01)
*G01S 19/05* (2010.01)
(Continued)

(52) U.S. Cl.
CPC .............. *G01S 19/13* (2013.01); *G01S 19/05* (2013.01); *G01S 19/07* (2013.01); *G01S 19/36* (2013.01);
(Continued)

(58) Field of Classification Search
CPC ........ H01Q 1/12; H01Q 1/1242; H01Q 21/28; G01S 19/01; G01S 19/03; G01S 19/05;
(Continued)

(56) References Cited

U.S. PATENT DOCUMENTS 5,786,789 A    7/1998  Janky
6,323,803 B1 *  11/2001  Jolley .................... G01S 19/05
                                              342/357.42
(Continued)

FOREIGN PATENT DOCUMENTS

EP           2000819 A1      12/2008
WO    WO-2006/062769 A2      6/2006

OTHER PUBLICATIONS

European Office Action dated May 11, 2015 issued in corresponding European Application No. 13290295.8.
(Continued)

*Primary Examiner* — Bernarr Gregory
(74) *Attorney, Agent, or Firm* — Harness, Dickey & Pierce, P.L.C.

(57) ABSTRACT

Embodiments provide for a positioning device comprising a global navigation satellite system (GNSS) receiving unit, a communication antenna and a communication module. The GNSS receiving unit is adapted to receive satellite information. The communication antenna allows for reception and/or transmission of complementary data. The communication module is connectable to the GNSS receiving unit and the communication antenna. The communication module is configured to provide complementary data received at the communication antenna to the GNSS receiving unit and/or to provide complementary data generated at the GNSS receiving unit to the communication antenna. The communication module is detachable or switchable for adaptation to an available communication technology.

17 Claims, 7 Drawing Sheets

(51) Int. Cl.
*G01S 19/07* (2010.01)
*G01S 19/36* (2010.01)
*G01S 19/41* (2010.01)
*H01Q 21/28* (2006.01)
*H01Q 1/12* (2006.01)
*G01S 19/00* (2010.01)

(52) U.S. Cl.
CPC ............ *G01S 19/41* (2013.01); *H01Q 1/1242* (2013.01); *H01Q 21/28* (2013.01)

(58) Field of Classification Search
CPC .......... G01S 19/07; G01S 19/13; G01S 19/35; G01S 19/36; G01S 19/38; G01S 19/39; G01S 19/40; G01S 19/41; G01S 5/0009; G01S 5/0018; G01S 5/0027; G01S 5/0072; H04B 1/06; H04B 1/08; H04W 4/02; G01C 21/26; G01C 21/34; G01C 21/3453; G01C 21/3484; G08G 1/16; G08G 1/161; G08G 1/163
See application file for complete search history.

(56) References Cited

U.S. PATENT DOCUMENTS

| | | | |
|---|---|---|---|
| 6,430,503 B1 * | 8/2002 | McBurney | G01S 19/36 342/357.46 |
| 6,751,467 B1 | 6/2004 | Cameron et al. | |
| 7,062,305 B1 | 6/2006 | Cameron et al. | |
| 7,110,762 B1 | 9/2006 | Cameron et al. | |
| 7,181,230 B2 * | 2/2007 | Nonoyama | G01S 5/0072 342/357.31 |
| 7,277,048 B2 * | 10/2007 | Hessing | G01S 5/0027 342/357.24 |
| 7,295,925 B2 * | 11/2007 | Breed | G01C 21/26 340/436 |
| 7,456,784 B2 * | 11/2008 | Beason | G01S 5/0072 342/357.34 |
| 7,574,215 B1 * | 8/2009 | Fan | G01S 5/0027 342/357.42 |
| 7,602,335 B2 * | 10/2009 | Pan | G01S 19/40 342/357.23 |
| 7,689,174 B2 * | 3/2010 | Rofougaran | H04B 1/08 455/552.1 |
| 8,611,953 B2 * | 12/2013 | Jordan | G01S 19/35 455/39 |
| 2006/0127096 A1 | 6/2006 | Nichols | |
| 2006/0173618 A1 * | 8/2006 | Eyer | G01C 21/3484 701/469 |
| 2008/0091352 A1 * | 4/2008 | O'Hare | G08G 1/163 701/301 |
| 2008/0176580 A1 * | 7/2008 | Dery | H04W 4/02 455/456.1 |
| 2010/0211314 A1 | 8/2010 | Zhukov et al. | |
| 2010/0214168 A1 | 8/2010 | Stucki | |

OTHER PUBLICATIONS

European Search Report dated Apr. 23, 2014 issued in corresponding European Application No. 13290295.8.
Magellan Professional "Z-Max®.Net Network Generation: Get Free From Operational Constraints," 2006.

* cited by examiner

POSITIONING DEVICE WITH COMMUNICATION MODULE AND ANTENNA

This application claims priority to European Patent Application No. EP13290295.8 filed on Nov. 29, 2013, the entire contents of which are incorporated herein by reference.

The present invention relates generally to the field of positioning and more particularly to positioning devices.

Positioning relates to the art of determining the position of a person, object or system on or near the surface of the Earth, i.e. the art of determining the coordinates of a location (latitude, longitude and altitude). Positioning is of interest in the technical field of surveying whose purpose is to e.g. establish land maps based on the determination of terrestrial or three-dimensional position of points using the relative distances and angles between these points. In such an application, the resulting land map will be dependent on the absolute position of the surveying system, a component of the surveying system or a surveyed object, as may be determined by a positioning device.

For at least such an application, there is still a need of providing new and improved positioning devices.

BRIEF SUMMARY OF THE INVENTION

According to a first general aspect, there is provided a positioning device comprising a global navigation satellite system (GNSS) receiving unit, a communication antenna and a communication module connectable to the GNSS receiving unit and the communication antenna. The GNSS receiving unit is adapted to receive satellite information. The communication antenna allows for reception and/or transmission of complementary data. The communication module is configured to provide the complementary data received at the communication antenna to the GNSS receiving unit and/or to provide to the communication antenna complementary data generated at the GNSS receiving unit. The communication module is detachable or switchable for adapting to an available communication technology.

The positioning device according to this first general aspect is advantageous in that it is adaptable to an available communication technology via the detachable or switchable communication module. The positioning device may therefore be adapted to a communication technology available where it is located. This ensures the reception and/or transmission of complementary data at a larger number of places on the Earth and thereby ensures also a certain level of reliability in the determination of a position of the positioning device.

It will be appreciated that communication with the positioning device may be bidirectional, i.e. the positioning device may be used to transmit and/or to receive complementary data at the communication antenna. Communication (or rather data transfer) within the positioning device, for instance between the GNSS receiving unit, the communication module and the communication antenna, may therefore also be bidirectional.

As a receiver, the GNSS receiving unit is adapted to receive satellite information and the communication antenna allows for reception of complementary data. The communication module is then configured to provide the complementary data received at the communication antenna to the GNSS receiving unit.

As a transmitter, the GNSS receiving unit is adapted to receive satellite information and the communication antenna allows for transmission of complementary data. The communication module is configured to provide to the communication antenna complementary data generated at the GNSS receiving unit.

It will be appreciated that the positioning device may be configured to function as both a transmitter and a receiver.

The communication module may be detachable from the positioning device. Thus, if it is noticed that a first communication technology with which the positioning device is configured to receive and/or transmit complementary data is not available, or if it is noticed that a first communication technology used by the positioning device is not efficient where the positioning device is located, e.g. because of obstacles like buildings, mountains or others, because of lack of communication coverage or because of local regulations, then the communication module (and the corresponding communication antenna) may be removed and replaced by another communication module (and its corresponding communication antenna) configured to receive and/or transmit another type of signal, i.e. signals in accordance with another communication technology. The possibility of modifying the communication technology with which the complementary data may be received and/or transmitted at the positioning device provides a flexibility improving the capability of distribution of complementary data.

For example, it may be envisaged that the communication module is part of a mechanical block (or mechanical element) detachable from the positioning device for modification of the communication technology used by the positioning device to receive and/or transmit complementary data. For example, the communication module and a connector arranged to attach the communication antenna to the communication module may form a single block or unit detachable from the positioning device. Depending on the communication technology to be used (or communication technology available at the location of the positioning device), another mechanical block including the appropriate communication module may be attached to the positioning device (and, in particular, to the GNSS receiving unit).

It will be appreciated that the detachable communication module may be inserted into the GNSS receiving unit and also be removable from the GNSS receiving unit to adapt to any available radio communication technology.

It may also be envisaged that the communication module may be attached to the GNSS receiving unit using a pull and push system with clips (or some kind of "clip-on" system), sliding slots (or sliding grooves), screws or any other attaching system rendering the communication module detachable from the positioning device and in particular from the GNSS receiving unit. In an embodiment, the communication module (or its enclosure) may be screwed to the housing of the GNSS receiving unit.

As an alternative, the communication module may be switchable such that it supports a plurality of communication technologies. In such an alternative, the communication module may be switched to a (selected) communication technology using e.g. a mechanical or electronic switch in order to modify the operating communication technology of the positioning device.

It will be appreciated that the GNSS receiving unit (or GNSS receiver) of the positioning device may include a GNSS antenna for reception of GNSS signals, a converting unit (or converting function) for converting the received GNSS signals into digital data and a processing unit (or processing function) for processing of the digital data.

The satellite information may be GNSS signals broadcasted from at least four space-based orbiting sources or satellites of any GNSS such as the Global Positioning System (GPS), the GLObal NAvigation Satellite System (GLONASS), the Galileo positioning system, the Compass/Beidou positioning system, the Quasi-Zenith Satellite System (QZSS) Navigation Service, the Indian Regional Navigation Satellite System (IRNSS) and similar systems, as long as there is an unobstructed line of sight from the GNSS antenna of the GNSS receiving unit to the satellites. The GNSS signals provide location and time information from which a position of the positioning device may be derived.

The GNSS receiving unit may obtain the digital data representative of the satellite information (derived from the GNSS signals) and the complementary data for further processing of these data.

The GNSS receiving unit may also obtain the digital data representative of the satellite information (derived from the GNSS signals) and, based on its own known position, be configured to generate complementary data.

According to a first mode of operation, the GNSS receiving unit may be configured to compute a position based on the received satellite information and the complementary data. Alternatively, the GNSS receiving unit may be configured to provide the received satellite information and the complementary data for external computation of a position. Such mode of operation may also be referred to as the "mobile" mode or rover configuration, which corresponds to the use of the positioning device to derive a position, either computed by the positioning device itself or computed externally by a second entity, using the satellite information and the complementary data obtained by the positioning device. In the rover configuration, the positioning device may be moved to different locations to determine the position of each of these locations. In such configuration, the processing unit of the GNSS receiving unit may be configured to compile/gather the received satellite information (or GNSS signals) and the complementary data for post-processing by an external computer to obtain a position. Alternatively, the processing unit may itself compute a position based on the digital data and the complementary data.

According to a second mode of operation, the GNSS receiving unit may be configured to generate complementary data based on a known position of the positioning device and the received satellite information. The generated complementary data may then be transferred to the communication module for transmission via the communication antenna. This second mode of operation may also be referred to as the base configuration or "station" mode, in which the positioning device is located at a known position and used to transmit complementary data to surrounding positioning devices (e.g. operating in the rover mode).

The GNSS receiving unit may be configured to compare the GNSS signals received at the GNSS receiving unit via the GNSS antenna with its own known position (or rather with expected signals representative of its own known position) and generate additional correction data based on this comparison. In a first configuration, the positioning device may be configured to transmit, via the communication antenna, complementary data including its known position (or information representative of its known position) and all the received satellite information with or without the result of the comparison (i.e. with or without the additional correction data). In a second configuration, the positioning device may be configured to transmit, via the communication antenna, complementary data including only the additional correction data, which reduces the amount of data to be transmitted at the expense of a reduced level of accuracy. Various formats may be used to transmit the complementary data.

The broadcasted complementary data may be received and used by any surrounding positioning device to further process its own data or compute a position. The complementary data may be transferred from the GNSS receiving unit to the communication module and then broadcasted from the communication module via the communication antenna.

According to an embodiment, the communication antenna may be detachable. In this embodiment, the communication antenna may be detached from the positioning device and replaced by another communication antenna, depending on the communication technology (or radio frequency) available at the location of the positioning device. The present embodiment provides flexibility as to the communication technology or radio frequency to be used for receiving and/or transmitting the complementary data.

For example, if it is noticed that a first frequency range at which the positioning device is configured to receive and/or transmit complementary data via the communication antenna is not available, or in other words that communication within a first frequency range is not possible (because of obstacles like buildings, mountains or others, or because of lack of communication coverage or local regulations) where the positioning device is located, then the communication antenna may be removed and replaced by another communication antenna configured to receive and/or transmit signals within a second frequency range. The flexibility in replacing the communication antenna according to the present embodiment improves the tuning of the positioning device.

The communication antenna may be detachable from the communication module to which the communication antenna is configured to transmit complementary data and/or from which the communication antenna is configured to receive complementary data. In particular, the communication antenna may be detachable independently of the detachment of any other antennas, such as the GNSS antenna of the GNSS receiving unit.

Accordingly, the communication antenna may be detached and replaced with a communication antenna corresponding to (or adapted for reception and/or transmission of data of) the available (or selected) communication technology. In other words, once the positioning device is configured to communicate in accordance with a specific communication technology, the communication antenna may also be detached and replaced to modify the receiving and/or transmitting frequency range, i.e. to adapt to another frequency range, for reception and/or transmission of data according to the specific communication technology.

It will be appreciated that in embodiments wherein the communication antenna is not detachable, then the communication module and the communication antenna configured to communicate in accordance with a first communication technology may be replaced by a communication module and a communication antenna configured to communicate in accordance with another communication technology. The communication module and the communication antenna may therefore, in these embodiments, form a single block detachable from the positioning device.

In an embodiment, the communication antenna may be at least one of a ultra high frequency (UHF) antenna and a code division multiple access (CDMA) antenna. In other words, the communication antenna may be, in the rover mode, an antenna adapted to receive UHF signals broadcasted from ground-based reference stations or may be an antenna adapted to receive CDMA signals such as beacons. In the base mode, the communication antenna may be adapted to transmit UHF signals or CDMA signals to surrounding positioning devices (operating in either modes).

In the following, a positioning device functioning in the base mode may also be referred to as a transmitting positioning device while a positioning device functioning in the rover mode may be referred to as a receiving positioning device.

The communication antenna may for example be configured to support frequencies in the 800 or 1900 MHz bands for CDMA communication or for at least one of the ranges 410-430, 430-450, 450-470, and 410-470 MHz for UHF communication. The communication module and/or the communication antenna may be replaced to support a communication technology and/or a frequency range for which reception and/or transmission is possible at the location of the positioning device. For example, depending on the local regulations of the country in which the positioning device is used, a narrow-band communication antenna, such as 430-450 MHz or 450-470 MHz, or a wide band communication antenna, such as 430-470 MHz to cover all possible frequencies, may be connected to the positioning device.

In an embodiment, the communication antenna may directly connect to the communication module via a connector. As an example, the communication antenna may be connected to a transceiver of the communication module through a thread. The communication antenna may then be replaced by unscrewing it from the communication module by means of a threaded connector suitable for the thread.

As an alternative, the communication antenna may include an interchangeable whip, which may be changed to modify the frequency range supported by the communication antenna. Depending on the requirements of the application (or of the operator of the positioning device) with respect to for instance frequency range and radiation coverage, it may be envisaged to replace only the whip for supporting a specific frequency band, thereby rendering the communication antenna compatible to several frequency bands. For example, the whip may be changed to support any one of the ranges 410-430, 430-450, 450-470, and 410-470 MHz for e.g. UHF communication.

According to an embodiment, the communication antenna may be mountable on a separate geodetic pole and connectable to the communication module via a cable. This embodiment is advantageous in that the communication antenna may be more freely located at a position providing improved (and possibly optimal) reception and/or transmission. The separate geodetic pole may be inserted in the ground or fixed on the ground in the vicinity of the positioning device. The communication antenna may then be mounted on the geodetic pole and connected to the communication module of the positioning device via a cable, such as e.g. a Neill-Concelman (TNC) cable.

In an embodiment, the communication module may be configured to support at least one of CDMA, UHF, 3G or 4G functionalities.

In a receiver mode (i.e. the rover mode), the complementary data received at the communication antenna from a transmitting positioning device may include at least one of differential GNSS correction data, satellite information received at the transmitting positioning device, characteristics of the transmitting positioning device and additional correction data computed at the transmitting positioning device.

In a transmitter mode (i.e. the base mode), the complementary data transmitted from the communication antenna to a receiving positioning device may include at least one of differential GNSS correction data, satellite information received at the positioning device, characteristics of the positioning device and additional correction data computed by the positioning device.

The satellite information may for instance include satellite ephemeris, satellite clock time and satellite almanacs for some or each one of the satellites.

The characteristics of the positioning device (or the transmitting positioning device) may include a known position of the (transmitting) positioning device (or expected signals/measurements representative of its known position) and/or a description of the (transmitting) positioning device for deriving its position.

The additional correction data computed by the positioning device may for example be based on a comparison between expected measurements (for a known position of the positioning device) and actual measurements obtained by the positioning device.

In an embodiment, the positioning device may further comprise an interface for transfer of data between the communication module and a processing unit (or processor) of the GNSS receiving unit. The interface may be adaptive to any communication technology.

In an embodiment, the interface may be part of a single detachable physical block including the communication module and optionally a connector for attaching the communication antenna. A modification of the operating communication technology may then be effected by replacing such a block to another block corresponding to the available communication technology.

In an embodiment, the communication antenna may be arranged to point at a direction opposite to a pointing direction of a GNSS antenna of the GNSS receiving unit. It will be appreciated that the GNSS antenna may be omnidirectional, in which case the communication antenna may be arranged to point in a direction opposite to a main (or central) pointing direction of the GNSS antenna. This may be implemented by arranging the communication antenna such that its pointing direction is opposite to a side of the GNSS receiving unit at which the GNSS antenna is arranged. This embodiment is advantageous in that it decreases interference between the GNSS antenna and the communication antenna, thereby avoiding modification of radiation pattern and phase center of the GNSS antenna and/or avoiding degradation of the GNSS antenna signals produced by out of band noise radiated by the communication antenna when used in the transmitter mode (or base mode).

Arranging the communication antenna and the GNSS antenna at opposite sides of the communication module is also advantageous in that the communication antenna may extend from the positioning device and may be inserted in a geodetic pole for surveying applications. This provides for an improved reception and/or transmission of the complementary data at the communication antenna, as will be further explained in an example below.

In an embodiment, the communication module may be connectable into a housing of the GNSS receiving unit, thereby providing a sealing for the communication module and protecting the electronics of the communication module from e.g. harsh weather conditions.

The communication antenna may be arranged external to (or outside of) a housing of the GNSS receiving unit. The GNSS antenna of the GNSS receiving unit and the communication antenna may then be arranged at opposite sides of the housing, i.e. opposite to each other relative to the housing of the GNSS receiving unit.

In an embodiment, the communication antenna may extend perpendicularly from a side, or portion, of the housing of the GNSS receiving unit. The communication antenna may also be connected at a center of such side or lower portion of the housing such that it is arranged along an axis of symmetry of the GNSS receiving unit.

Advantageously, the communication antenna may be arranged within a detachable radio-transparent rod or pole. The communication antenna is thereby hidden in the radio-transparent pole. The radio-transparent pole may conveniently be detached from the positioning device (e.g. from the housing of the GNSS receiving unit) independently of the communication antenna. In other words, the communication antenna remains in place during screwing and unscrewing operations of the radio-transparent pole.

The radio-transparent pole may also be used to hold the positioning device, in e.g. a geodetic pole for surveying applications. The radio-transparent pole may be inserted in a radio-transparent elongated support, or radio-transparent geodetic pole, fixable in the ground. Such geodetic poles are commonly used in surveying applications to maintain a target for e.g. measurements of distance and angles from the target to the surveying instrument. The positioning device mounted on such a geodetic pole with the communication antenna and its radio-transparent rod inserted in it may then determine the position of a reference target to which distances and angles are measured to define other points of the surveyed landscape. The respective positions of these other points may then be derived from the position obtained by the positioning device itself or by an external computer receiving the satellite information and complementary data gathered by the positioning device in case of post-processing.

Such an arrangement of the communication antenna in a radio-transparent rod at a side of a housing of the GNSS receiving unit opposite to the side at which a GNSS antenna of the GNSS receiving unit is arranged provides the possibility to insert the rod with the communication antenna inside a geodetic pole, which is advantageous in that it reduces masking of radio communication waves at the communication antenna by the geodetic pole as compared to an arrangement wherein the communication antenna could not be inserted in the geodetic pole. This improves reception and/or transmission of the complementary data at the communication antenna and provides a more reliable positioning device.

In an embodiment, the communication antenna may be arranged within a pole (or rod) having a first end attached to a housing of the GNSS receiving unit or a housing of the communication module. A second end, opposite to the first end, may include a connector for connection of the positioning device to an external apparatus. As an example, the connector may be a ⅝" insert.

Apart from the already described surveying applications, the positioning device may also be used in agricultural applications wherein position of a machine or vehicle (such as a tractor) may be necessary. The positioning device may then be mounted on top of such a vehicle and provide navigation information via repetitive reception of satellite information and complementary data. The processing unit of the GNSS receiving unit may control the time period between each collection of data and/or determination of the position to compute a velocity.

According to an embodiment, the GNSS receiving unit may include a housing comprising a thermally conducting thread for connection of a pole in which the communication antenna is arranged. In this embodiment, the thread is in thermal contact with the communication module, thereby providing for an improved heat dissipation from the communication module via the thread.

According to another embodiment, the communication module may be enclosed in a housing including a thermally conductive portion in thermal contact with a shielding of a transceiver of the communication module (and optionally with an external radiator). The present embodiment provides also an improved dissipation of heat from the communication module.

Improved heat dissipation is particularly advantageous when the communication module is operated as an emitter like in the base configuration, i.e. when a transceiver of the communication module transmits complementary data via the communication antenna.

According to a second general aspect, there is provided a positioning device comprising a GNSS receiving unit, a communication antenna and a communication module. The communication module may be structurally arranged between the GNSS receiving unit and the communication antenna. The communication antenna may be connectable to the communication module and allow for reception and/or transmission of complementary data. The GNSS receiving unit may be connectable to the communication module for obtaining or generating the complementary data and is also configured to receive GNSS signals. The GNSS antenna may be arranged inside (a housing of) the GNSS receiving unit and the communication antenna may be arranged external to (the housing of) the GNSS receiving unit. The communication module may be detachable from the positioning device or, alternatively, switchable, for adapting to an available communication technology.

The communication antenna may be detachable from the communication module independently of the arrangement or connection of a GNSS antenna in the GNSS receiving unit. Accordingly, the communication antenna may be detachable from the positioning device, and in particular from the communication module, without requiring detachment of a GNSS antenna of the GNSS receiving unit.

According to a third general aspect, there is provided a positioning device comprising a GNSS receiving unit in which a communication module is integrated. The positioning device may also comprise a communication antenna connectable to the communication module. In other words, the GNSS receiving unit with its GNSS antenna and the communication module may be arranged within the same housing and the communication antenna may be arranged external to the housing. The communication module may be configured to transmit complementary data received at the communication antenna to a processor of the GNSS receiving unit or to provide complementary data generated at a processor of the GNSS receiving unit to the communication antenna. The processor of the GNSS receiving unit may obtain data representative of satellite information (or GNSS signals). The processor of the GNSS receiving unit may compute a position of the positioning device based on the obtained digital data and the complementary data. Alternatively, the processor may provide the obtained digital data and the complementary data to another entity for external computation of a position of the positioning device. As yet another alternative, the processor of the GNSS receiving unit may generate complementary data based on the obtained digital data and its own known position for transmission from the positioning device via e.g. the communication antenna. The communication module may be detachable or switchable for adaptation to an available communication technology. The communication antenna may also be detachable.

It is noted that other embodiments using all possible combinations of features recited in the above described embodiments and aspects may be envisaged.

Exemplifying embodiments will now be described in more detail, with reference to the following appended drawings:

DETAILED DESCRIPTION OF THE INVENTION

Figure 1:
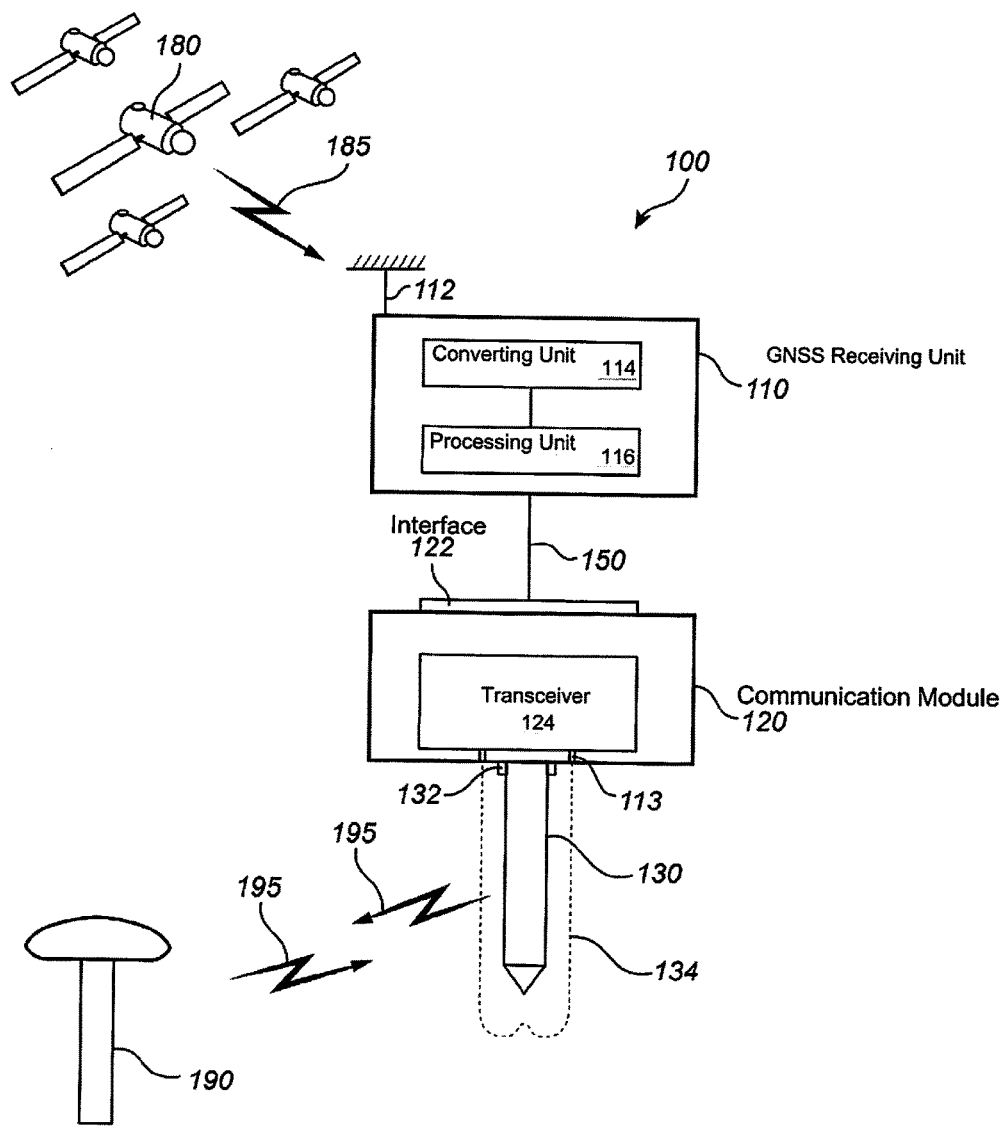
FIG. 1 shows a block diagram illustrating the functional elements of a positioning device according to an embodiment.

As illustrated in the figures, the sizes of the elements, layers and regions may be exaggerated for illustrative purposes and, thus, are provided to illustrate the general structures of the embodiments. Like reference numerals refer to like elements throughout.

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

A positioning device may generally comprise an antenna for receiving signals from four or more space-based orbiting sources (or satellites) of a GNSS and a processor for determining a position by computation of the received signals. The GNSS signals may for example be received from any GNSS such as GPS, GLONASS, Galileo, Compass/Beidou, QZSS, IRNSS or the like.

The basic operation principle of a positioning device is to calculate its position by precisely timing the signals sent by the satellites. Each of the messages broadcasted by the satellites includes a time stamp indicating the time the message was transmitted from the satellite and the satellite position when the message was transmitted. A distance to each of the satellites may then be derived based on the transit time of each message and the speed of light. Computation of these distances may result in the location (or three-dimensional position) of the positioning device.

In addition, the accuracy of a position computed by a positioning device may be enhanced using signals received from e.g. a network of fixed, ground-based reference stations broadcasting messages indicating the difference between their positions as indicated by the satellite systems and their own known fixed positions.

With reference to FIG. 1, a positioning device 100 according to an embodiment is described. FIG. 1 shows the positioning device in the form of a block diagram.

The positioning device 100 comprises a GNSS receiving unit 110, a communication module 120 and a communication antenna 130. The GNSS receiving unit 110 comprises a GNSS antenna 112 for reception of GNSS signals 185 from satellites 180, a converting unit 114 for converting the received GNSS signals 185 into digital data and a processing unit (or processor) 116 for processing the digital data. It will be appreciated that in some embodiments the converting unit 114 may be integrated within the processing unit 116. In other words, a single processing unit 116 may provide the converting function and other processing functions such as the computation of a position from the digital data. These units or functions may be realized on a single electronic circuit board (a main electronic circuit board) or several electronic circuit boards.

The communication module 120 is connected to the processing unit 116 via an interface 122 and a data link 150. The interface 122 is adapted to convert signals received from the communication module to signals readable by the processing unit 116. The signals are transferred via the data link 150. The communication module may include a transceiver or radio modem 124. The transceiver 124 may transmit and/or receive signals to or from the communication antenna 130.

The positioning device 100 comprises also a communication module 120 to which the communication antenna 130 is attached. The communication module 120 may be configured to support at least one of CDMA, UHF, 3G or 4G functionalities. The communication module 120 is detachable such that it can be replaced by another communication module supporting another communication technology. For example, if an operator notices that an UHF communication module does not function properly and e.g. does not receive any complementary data, the communication module may be replaced by a CDMA or 4G communication module. However, it may also be envisaged that the communication module 120 is switchable such that the selection of the communication technology is effected via a switch.

Availability of a communication technology may be determined on a case-by-case basis by an operator. For example, if the positioning device includes a UHF communication module, the UHF module allows for an operator to install a first positioning device in the base mode and to use another positioning device in the rover mode. The positioning device used in the rover mode may then receive complementary data from the positioning device used in the base mode.

Further, although some positioning device may be equipped with a GSM 3.5 G module, which may be used to receive correction data from land surveying providers, the GSM 3.5 G technology may not be supported in certain countries. In such case, an operator may replace a communication module equipped with a UHF modem with a CDMA communication module, thereby providing the possibility to receive the complementary data.

The communication antenna 130 is adapted to receive and/or transmit complementary data 195. The complementary data may be received at (or transmitted from) the communication antenna 130 as an UHF signal. For example, an UHF signal may be received from a ground-based reference station 190, such as illustrated in FIG. 1.

In addition, the communication antenna 130 may be detachable from the communication module 120 such that it may be replaced by another communication antenna capable of receiving and/or transmitting the complementary data 195 within another frequency range. In particular, the communication antenna may be replaced such that it may receive and/or transmit data at another frequency band or in accordance with another communication technology. The communication antenna 130 may for instance receive and/or transmit CDMA signals (beacons). The communication antenna 130 may be a UHF antenna or a CDMA antenna.

Connection of the communication module 120 to the processing unit (or the main electronic circuit board) 116 of the GNSS receiving unit 110 may be effected via an interface 122. The interface 122 allows for transfer of data between the communication module 120 and the processing unit (or processor) 116 of the GNSS receiving unit 110. The interface 122 may be adaptive to any communication technology.

If the communication module 120 is switchable between different communication technologies, the interface may be communication technology independent such that it provides for transfer of data from the communication module 120 to the processing unit 116 of the GNSS receiving unit 110 independently of the communication technology. Alternatively, the interface 122 may also be switchable such that the interface becomes active according to a selected communication technology corresponds to the communication technology selected for the communication module 120.

Alternatively, the interface 122 may be custom made and comprise for example a combination of a first interface for connection to the processor 116 of the GNSS receiving unit 110 and a second interface for connection of a particular kind of communication module (or modem) 120. The purpose of the interface is to provide a connection between the communication module 120 and the processor 116 of the GNSS receiving unit 110 and to provide the necessary adaptation (or conversion) of the signals between the communication module 120 and the processor 116 of the GNSS receiving unit 110. In this embodiment, an interface is specific for a communication technology.

The interface 122 may then also be detachable from the positioning device 100 for adapting to another communication technology. The interface 122 may conveniently form a single block with the communication module 120 such that the whole block may be removable from the positioning device 110 for replacement by another block (i.e. another communication module and interface) adapted for communication via another radio communication technology. The interface 122 then ensures data transfer between the other communication module and the processing unit 116 of the GNSS receiving unit 110.

The communication antenna 130 may be connected to the communication module 120 via a connector 132. For example, the communication antenna 130 may be connected via a threaded connector 132 such as a threaded Neill-Concelman (TNC) connector or the like. The communication antenna 130 may in this embodiment be attached to or detached from the communication module 120 by screwing and unscrewing, respectively. Other attachment systems may also be envisaged such as a click-in click-out system or the like.

The communication antenna 130 and the GNSS antenna 112 of the GNSS receiving unit 110 may be arranged on opposite sides of the communication module 120. In other words, the communication module 120 may structurally be arranged between the communication antenna 130 and the GNSS antenna 112.

The communication antenna 130 may be arranged within a pole (or antenna tube) 134 which may be attached to the positioning device 100 via a thread 113. The pole 134 may therefore also be detachable from the positioning device 100, which facilitates the replacement of the communication antenna 130 located in it. The pole 134 may include radio-transparent material for reducing, or eliminating, the effect of attenuation of electromagnetic radiation received at or transmitted from the communication antenna 130.

The complementary data 195 may be received at the transceiver or modem 124 via the communication antenna 130 and modulated at the modem 124 for transfer to the processing unit 116 of the GNSS receiving unit via the interface 122 and data link 150. Analogously, the complementary data 195 generated at the processing unit 116 of the GNSS receiving unit 110 may be modulated and transferred to the transceiver or modem 124 via the data link 150. The complementary data may then be transmitted to another GNSS receiving unit via the communication antenna 130.

According to a first mode of operation, the positioning device may be used in a rover configuration. In this configuration, the GNSS receiving unit 110 may obtain the GNSS signals 185 and the complementary data 195 for further processing like e.g. computation of a position of the positioning device 100. A position of the positioning device 100 may be determined, either by the positioning device itself or externally. The processing unit 116 of the GNSS receiving unit 110 may therefore be configured to compute the position of the positioning device 100 based on the received GNSS signals and the complementary data. In this case, real-time positioning may be obtained. The complementary data improves the accuracy of the computed position, usually from an accuracy of some meters to an accuracy of some centimeters. Alternatively, the GNSS signals 185 (or the converted digital data) and the complementary data 195 may be transferred to an external computer for post-processing. The data may for instance be transferred to the external computer by means of a USB port or other techniques for wireless data transfer such as Bluetooth, as available in the GNSS receiving unit.

According to a second mode of operation, the positioning device may be used in a base configuration or "station mode". In this configuration, the positioning device 100 generates complementary data to be broadcasted to other positioning devices, which may use such complementary data for computation of a position, or to other base stations which may then forward the generated complementary data. For this purpose, the positioning device may be able to connect to a network of other devices or base stations. The processing unit 116 may generate the complementary data based on a known position of the positioning device 100 and the received GNSS signals 185. The generated complementary data is then transferred via the interface 122 from the GNSS receiving unit 110 to the communication module 120 for transmission via the communication antenna 130.

In addition to the two above described modes of operation, the positioning device 100 may also be used in a relay mode in which complementary data 195 directly received at a modem of the GNSS receiving unit 110, or at any ports of the GNSS receiving unit 110, may be transferred to the communication module 120 via the interface 122 for further transmission via the communication antenna 130. Such relay function may be activated while the positioning device 100 is used as in the base mode or while the positioning device 100 is used in the rover mode such that other positioning devices may also obtain the complementary data received at the positioning device."

Figure 2A:
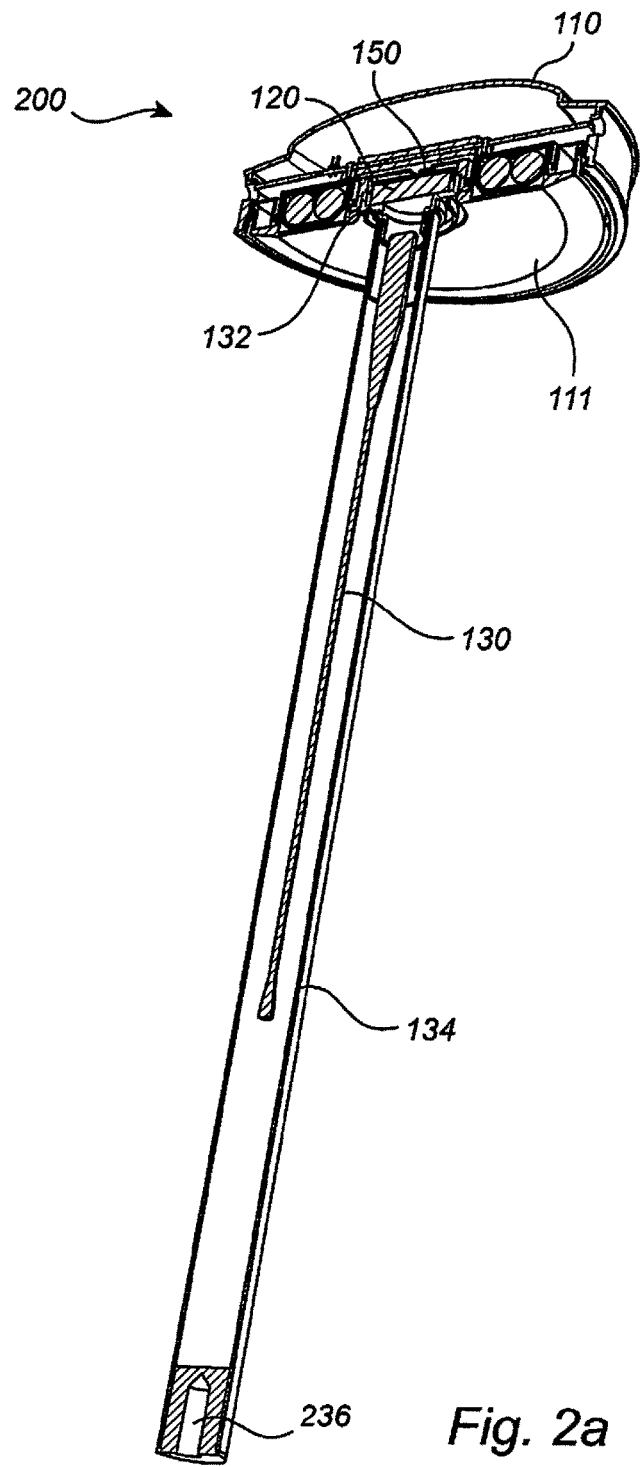
FIG. 2a shows a perspective view of a positioning device according to an embodiment and FIG. 2b shows an enlarged cross-sectional view of the same positioning device.
Figure 2B:
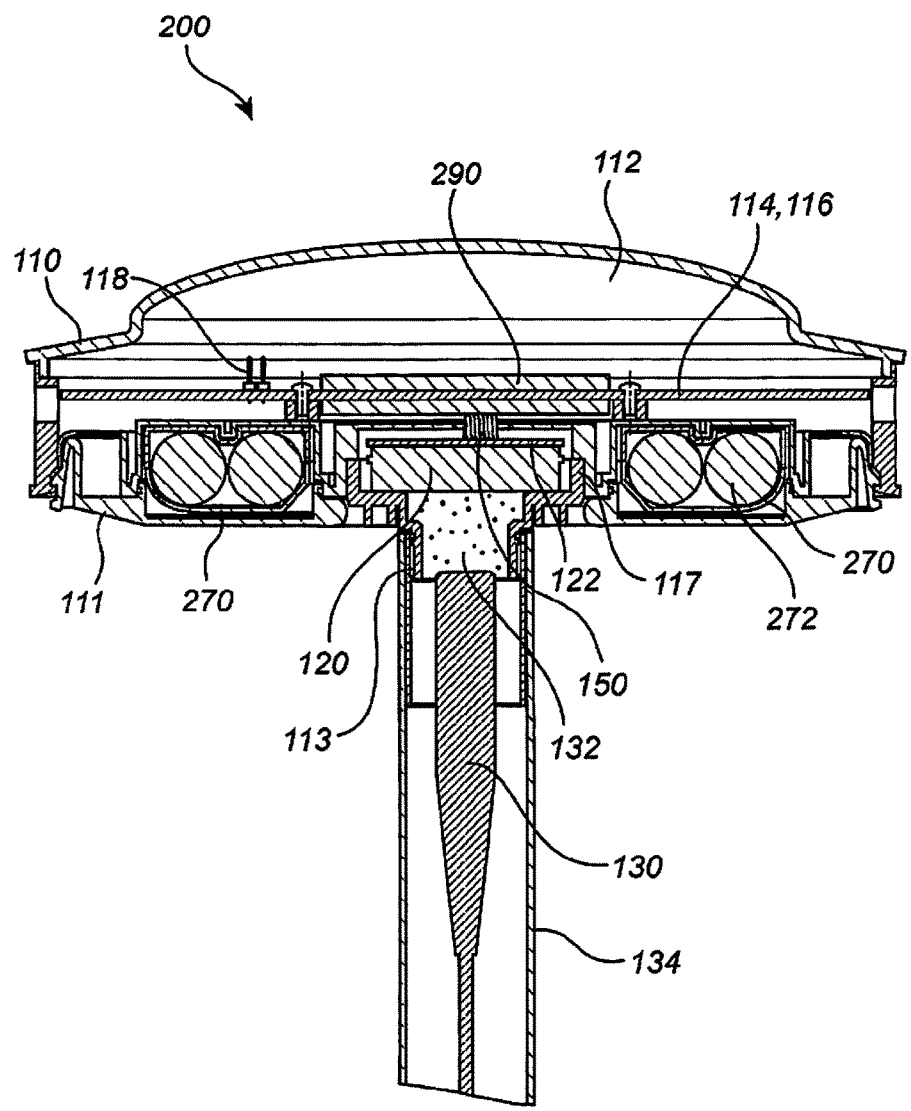

With reference to FIGS. 2a and 2b, a positioning device 200 according to an embodiment is described. FIG. 2b provides an enlarged cross-sectional view of an upper part (namely the GNSS receiving unit and the communication module) of the positioning device.

The positioning device 200 comprises the functional blocks of the positioning device 100 described with reference to FIG. 1. FIG. 2 provides additional structural details in a specific arrangement.

The positioning device 200 comprises a GNSS receiving unit 110 with a housing 111. The housing 111 of the GNSS receiving unit comprises an upper part in which the GNSS antenna 112 is lodged and a lower part in which components such as the processing unit, batteries and other electronics are arranged. The processing unit may be part of a main electronic circuit board to which reference may be made in the following. The main electronic circuit board will also be denoted 116. The upper part of the housing 111 may be in the form of a dome or cupola, thereby providing a circular configuration for arrangement of an omnidirectional antenna. The lower part of the housing 111 may have a rectangular or square shape as shown in FIG. 2 but may have any other shape.

Although not described in detail here, it will be appreciated that the GNSS antenna 112 may for example include an antenna patch, a ceramic element, a low noise amplifier and filters. The GNSS antenna 112 is lodged inside the housing 111 of the GNSS receiving unit 110.

Further, it will be appreciated that the definition of a lower part and an upper part herein makes reference to the positioning device as it stands when the communication antenna points downwards (as represented in the drawings of FIGS. 1-5), i.e. as it is intended to stand during operation with the communication antenna inserting in a geodetic pole fixed in the ground. However, it will be appreciated that the function of the positioning device is not affected even if it would be used differently.

The housing 111 of the GNSS receiving unit 110 encloses the GNSS antenna 112 connected to the main electronic circuit board 116 via an antenna connector 118. The main electronic circuit board 116 may be arranged between two shielding portions 290.

The positioning device 200 comprises also a communication module 120 to which a communication antenna 130 is attached. In the embodiment shown in FIGS. 2a and 2b, the communication module 120 is connected into the GNSS receiving unit 110, i.e. the communication module 120 is arranged within the housing 111 of the GNSS receiving unit 110. More specifically, the communication module 120 is arranged in the lower part of the GNSS receiving unit 110.

The GNSS receiving unit 110 and the communication module 120 may therefore be integrated in the same housing 111 with the communication module being switchable or detachable from the housing 111 for adapting to an available communication technology. The communication antenna 130 may be arranged external to the housing 111.

The communication module 120 may be configured to support at least one of CDMA, UHF, 3G or 4G functionalities. The communication module 120 may be detachable such that it can be replaced by another communication module supporting another communication technology. However, such as described above with reference to FIG. 1, it may also be envisaged that the communication module 120 is switchable such that the selection of the communication technology is effected via a switch. The advantages and particularities of the communication module 120 described with reference to FIG. 1 apply also to the communication module 120 described herein with reference to FIGS. 2a and 2b.

Similarly, connection of the communication module 120 to the processing unit (or the main electronic circuit board) 116 of the GNSS receiving unit 110 may be performed via an interface 122. The interface 122 allows for transfer of data between the communication module 120 and the processing unit (or processor) 116 of the GNSS receiving unit 110. The interface 122 may be adaptive to any communication technology. The advantages and particularities of the interface 122 described with reference to FIG. 1 apply also to the interface 122 described herein with reference to FIGS. 2a and 2b.

The communication antenna 130 may be directly connectable to the communication module 120 via a threaded antenna connector 132. The communication antenna 130 may be detached by unscrewing using the threaded antenna connector 132 such as a TNC connector. An operator has therefore the possibility to change the communication antenna 130 to e.g. adapt the frequency range. The communication antenna 130 may for example be configured to support frequencies in the 800 or 1900 MHz bands for CDMA communication or for at least one of the ranges 410-430, 430-450, 450-470, and 410-470 MHz for UHF communication.

The detachable communication antenna 130 may extend perpendicularly to a side of the lower part of the housing 111 of the GNSS receiving unit 110. The connection point of the communication antenna 130 to the communication module 120 may correspond to a center position of the side of the lower part of the housing 111. In this configuration, the resulting positioning device may have a "mushroom-like" (or "umbrella-like") design with a "head" corresponding to the housing 111 including the GNSS receiving unit 110 and the communication module 120 and a "foot" corresponding to the communication antenna 130. It will be appreciated that the communication antenna 130 may be connected to the communication module 120 differently, as further illustrated in e.g. FIG. 6.

The communication antenna 130 is arranged to point at a direction opposite to a side of the GNSS receiving unit at which the GNSS antenna 112 is arranged.

The complementary data received and/or transmitted at the communication antenna 130 may be differential GNSS correction data such as data obtained from the Differential Global Positioning System (DGPS) or other similar systems of fixed, ground-based reference stations. The complementary data may for example also be satellite ephemeris, satellite clock time, satellite almanacs and compensation data for atmospheric effects or data to help correction for distortion caused by the ionosphere. Such satellite information may be either, in the rover mode, received at the positioning device from a surrounding positioning device operating in transmission (i.e. from a surrounding positioning device operating in the base mode) or, in the base mode, transmitted to a surrounding positioning device (operating in either modes).

The complementary may also be the characteristics of the positioning device or the surrounding positioning device. Such characteristics may include a known position of the positioning device and/or a description of the positioning device for deriving its position.

The GNSS receiving unit 110 of the positioning device 200 may include at least one electronic circuit board 116 to which the interface 122 is connected via e.g. a RS232 connector (or RS232 port). The positioning device 200 may be equipped with a flat cable 150 for establishing a data link between the communication module 120 or the interface 122 and the processing unit 116 of the GNSSS receiving unit 110. The electronic circuit board 116 may for example provide for power supply to, activation/deactivation of, signal reset of, or presence detection of the communication module 120.

The communication antenna 130 may be arranged within a pole 134 detachable from the housing 111 via e.g. a thread 113. The pole 134 protects the communication antenna 130. The pole 134 is also convenient for holding the positioning device 200.

The thread 113 may be part of a physical element 117 providing a cavity in which the communication module 120 may be arranged. The element 117 may be inserted inside the housing 111 of the GNSS receiving unit 110. Such element may provide for external connection of the communication antenna 130 via the thread 113 at the housing 111 of the GNSS receiving unit 110 and provide a cavity towards the inside of the housing 111 of the GNSS receiving unit 110 for lodging the communication module. The thread 113, or the element 117 in general, may be thermally conductive, thereby improving dissipation of heat generated by the communication module 120. Further, the antenna connector 132 may be located within the thread 113 of the element 117.

The communication module 120 and the interface 122 may conveniently form, together with the antenna connector 132 and the thread 113, a physical block or entity (113/117+ 120+122+132) which is removable as a single block (or single entity) from the lower part of the housing 111 of the GNSS receiving unit 110. This block may for example be attached and detached from the housing 111 of the GNSS receiving unit 110 using screws. A change in communication technology may therefore be effected by detaching from the housing 111 the block including the thread 113, the antenna connector 132, the communication module 120 and the interface 122 and attaching to the housing another mechanical block including the same elements adapted for another communication technology. An operator of the positioning device may thereby switch from e.g. UHF to CDMA or 4G and vice versa. A connection to the processing unit 116 of the GNSS receiving unit 110 may be established by inserting the flat cable into the (other) mechanical block to be attached.

Although it is described in the above embodiment that the thread 113, the antenna connector 132, the communication module 120 and the interface 122 form a single (physical) block detachable from the housing 111 of the GNSS receiving unit, it will be appreciated that other arrangements may be envisaged to render the communication module 120 and its interface 122 detachable from the housing 111 of the GNSS receiving unit. These elements may be detachable either separately or according to other combinations. Detachable blocks or modules facilitate configuration changes.

The positioning device 200 may also be equipped with batteries 270 (with their accumulators or battery sticks 272) for power supply to the communication module 120, the processing unit 116 of the GNSS receiving unit 110 and other electronic components of the positioning device 200.

Figure 3:
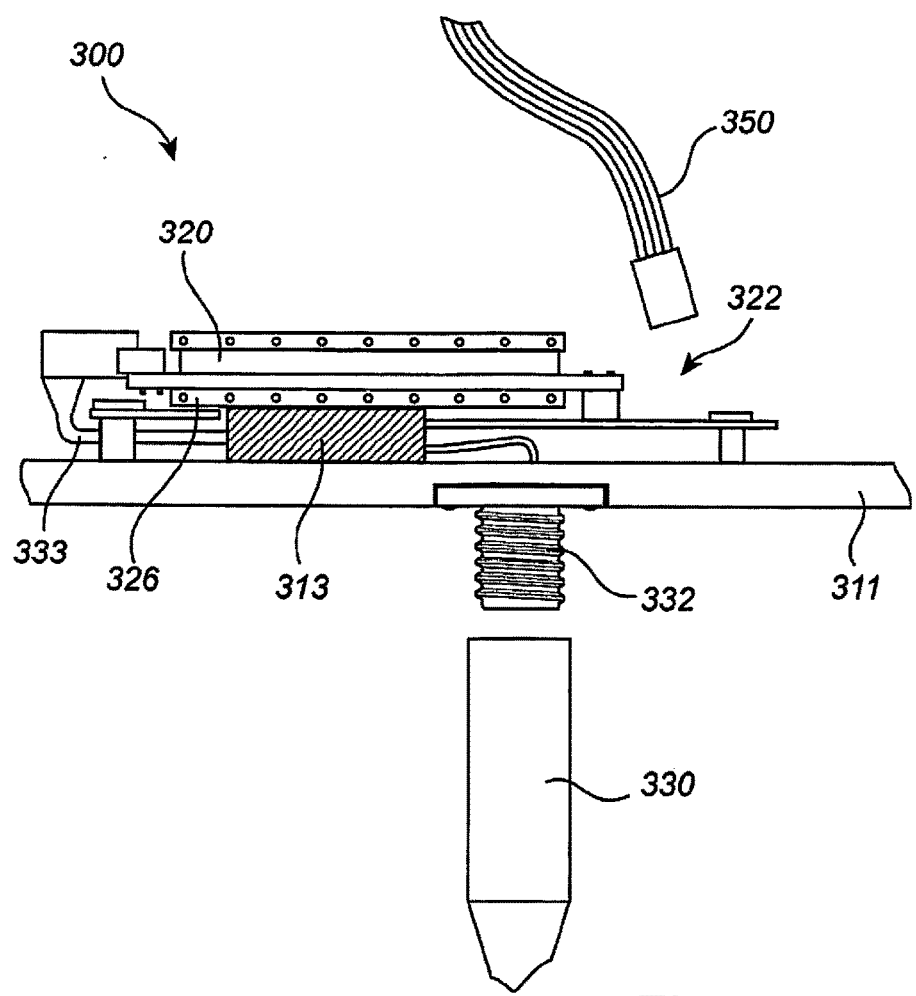
FIG. 3 shows a cross-sectional view of parts of a positioning device according to another embodiment.

With reference to FIG. 3, a positioning device 300 according to another embodiment is described.

FIG. 3 shows a cross-sectional view of a positioning device 300 comprising a GNSS receiving unit (not shown), a communication module 320 and a detachable communication antenna 330.

In the embodiment shown in FIG. 3, the communication antenna 330 is connected to an antenna connector 332 attached to a housing 311 in which the communication module 320 is arranged. The housing 311 may be the housing of the GNSS receiving unit. The antenna connector 332 is connected by a RF cable 333 to the communication module 320 for transfer of the signals obtained by the communication antenna 330 to the communication module 320 (or from the communication module 320 to the communication antenna 330 in case of transmission). The communication module 320 is mounted on a communication interface 322 connected to a cable 350 originating from an electronic circuit board (not shown) or a combination (sandwich) of electronic circuit boards of the GNSS receiving unit. The cable 350 may provide power supply to the communication interface 322 and also allow for other functions such as activation/deactivation of, signal reset of, or presence detection of the communication module 120.

The communication interface 322 enables the conversion and the transfer of data from the communication module 320 to the GNSS receiving unit via the cable 350 (or from the GNSS receiving unit to the communication module 320 in case of transmission).

Still referring to FIG. 3, the housing 311, in which the communication module 320 may be enclosed, may include a thermally conductive portion 313 in thermal contact with a transceiver shielding 326 of the communication module 320. The thermally conductive portion 313 may be implemented by means of a thermally conductive foam arranged between the housing 311 and the transceiver shielding 326. The thermally conductive portion 313 may optionally be in thermal contact with an external radiator (not shown).

The functions and structures of the communication module 320, the detachable communication antenna 330 and the interface 322 may be equivalent to those described above with reference to FIGS. 1 and 2 for the corresponding elements of the positioning devices 100 and 200, respectively. These functions and structures are not repeated here for the sake of economy.

Figure 4:
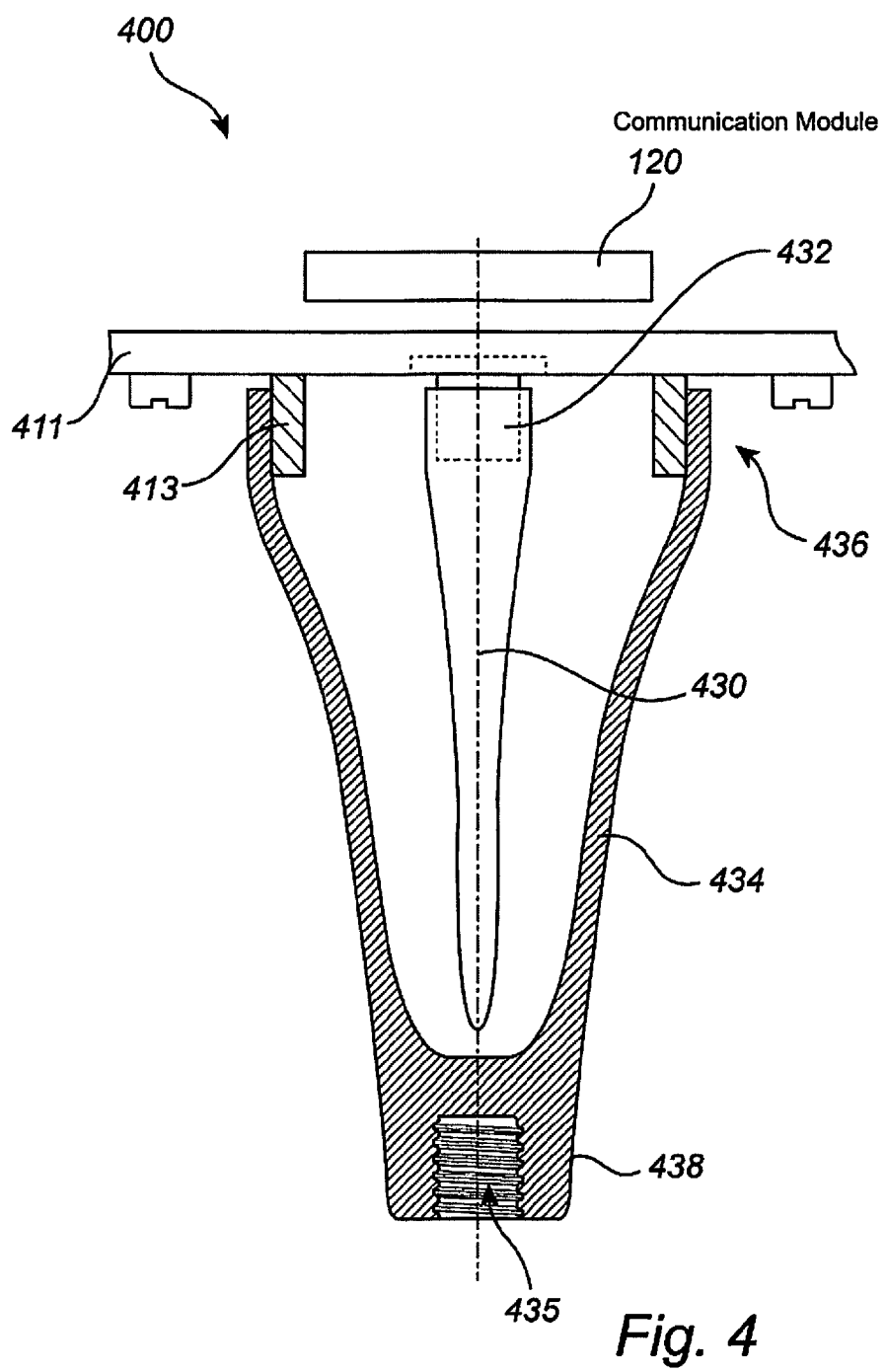
FIG. 4 shows a cross-sectional view of a communication antenna of a positioning device in accordance with an embodiment.

With reference to FIG. 4, an arrangement of a communication antenna of a positioning device according to an embodiment is described.

FIG. 4 shows the lower part of a positioning device 400 with a housing 411 enclosing a communication module 120 (for example the housing of the GNSS receiving unit). A detachable communication antenna 430 is connected to an antenna connector 432 attached to the housing 411. The communication antenna may optionally be directly connected to the communication module 120. The communication antenna 430 is arranged within a pole 434 attached to the housing 411 through attaching means or an attaching system such as a thread 413.

In the present embodiment, the rod or pole 434 has a first end 436 and a second end 438 opposite to the first end 436. The first end 436 of the pole 434 is attached to the housing 411 of the GNSS receiving unit (not shown in detail in this figure) via the thread 413. The second end 438 may include a connector 435, such as a ⅝" insert, for connection of the positioning device 400 to an external apparatus.

Turning back to FIG. 2, another kind of connector 236 is depicted. The connector 236 is integrated in the pole 134. The connector 236 may be a ⅝" (⅝ inches) insert, which provides a mechanical interface standard in land surveying equipments. With such a connector, it is possible to screw the pole 134 on another pole (not shown) in order to place the GNSS receiving unit at about 2 meters above the ground.

Figure 5:
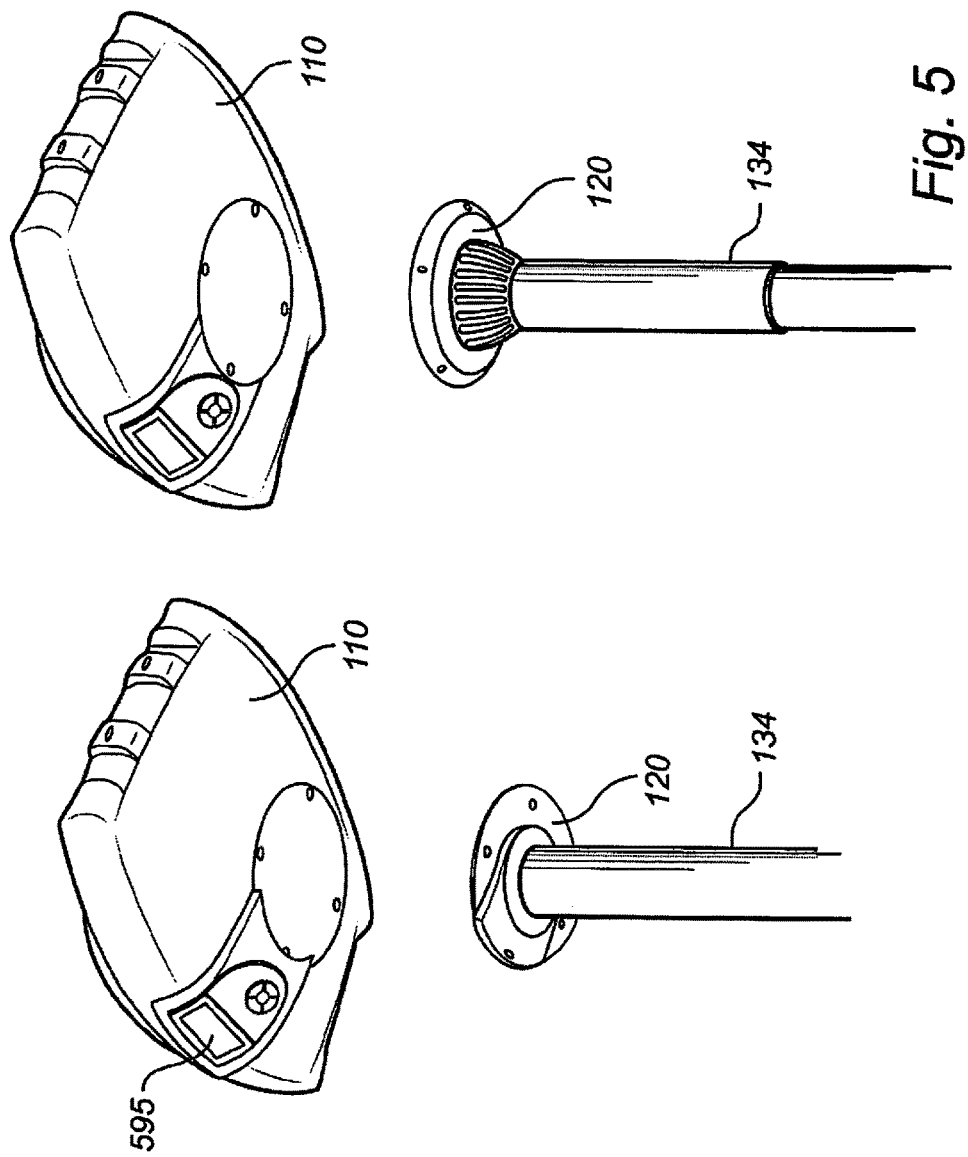
FIG. 5 shows three-dimensional views of positioning devices in accordance with further embodiments.

With reference to FIG. 5, positioning devices in accordance with other embodiments are described. FIG. 5 shows two three-dimensional views of two positioning devices differing from one to another by their type of communication module.

FIG. 5 shows on the left-hand side a positioning device including a pole 134 in which a detachable communication antenna (not visible) is arranged. The pole 134 may be unscrewed for access to the communication antenna in case the communication antenna needs to be replaced. The communication antenna may remain still relative to the GNSS receiving unit 110 during screwing and unscrewing operations of the pole 134. The communication module 120 may be detachable for replacement in case of change in communication technology for receiving and/or transmitting the complementary data.

The positioning device may also include an input/output device 595 such as a touch display, or buttons, for data entry by an operator and/or for display of data computed by the positioning device. Such data entry may be a known position at which the positioning device is located for use in the base mode. This may also be a selection of the mode of operation, namely the base mode or the rover mode.

FIG. 5 shows on the right-hand side a positioning device equivalent to the positioning device shown on the left-hand side except that the communication module 120 has been replaced by another communication module 120 supporting another type of communication technology.

FIG. 5 show embodiments in which the communication modules 120 are detachable from the positioning device using screws.

Figure 6:
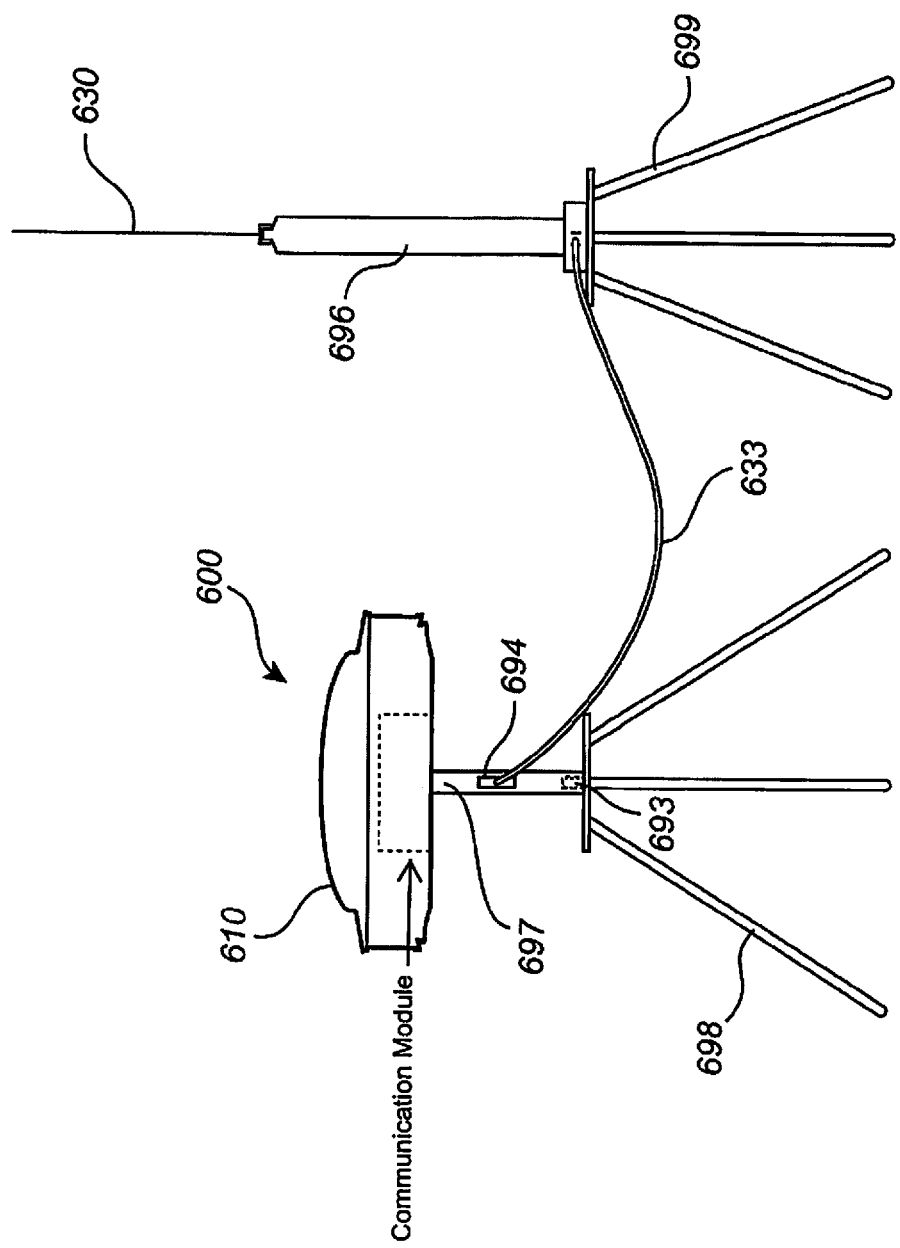
FIG. 6 shows a schematic view of a positioning device according to yet another embodiment.

With reference to FIG. 6, a positioning device in accordance with another embodiment is described.

FIG. 6 shows a positioning device 600 comprising a GNSS receiving unit 610 (with its GNSS antenna 612), a communication module 620 and a communication antenna 630. The GNSS receiving unit 600 and the communication module 620 may be equivalent to any one of the GNSS receiving units and communication modules described in the above embodiments.

In the embodiment depicted in FIG. 6, the communication antenna 630 is connected to the communication module 620 via a coaxial cable 633. The communication antenna 630 is arranged at a base (or support) 696 mounted on a tripod 699 (or a geodetic pole). An extremity of the coaxial cable 633 is connected to the communication module 620 via a first connector (not shown), such as a TNC, while the opposite extremity is connected to the communication antenna 630 via a second connector, such as a TNC, provided at the base 696 (or antenna base). The antenna base 696 provides therefore an interface for connection of the communication antenna 630 to the coaxial cable 633. The antenna base 696 provides also a mechanical interface between the communication antenna 630 and the tripod 699. A part of the communication antenna 630 is inserted in the antenna base 696 for connection to the coaxial cable 633 while another part of the communication antenna 630 extends upwards outside of the antenna base 696.

The GNSS receiving unit 610 and the communication module 620 may be integrated within the same housing, as shown in FIG. 6. In the configuration shown in FIG. 6, the GNSS receiving unit 610 is mounted above the communication module 620 within the housing. The housing is arranged on a base or support 697 itself mounted on a tripod 698 or other kinds of geodetic pole for providing a stable installation of the GNSS receiving unit 610 and the communication module 620 relative to the ground. For this purpose, the base 697 may comprise at one end a connector 693, such a ⅝" connector, for providing a standard mechanical interface to the tripod 698. At the other end, the base 697 may be equipped with another mechanical connector, which is specific for connection to the communication module 620.

An opening (or slit) 694 may also be provided at the base 697 (on which the housing is mounted) for inserting the coaxial cable 633 and thereby allowing a connection between the cable 633 and the communication module 620 at the first connector. The base 697 may be elongated and may have a cylindrical shape, like a tube.

The person skilled in the art realizes that the present invention by no means is limited to the preferred embodiments described above. On the contrary, many modifications and variations are possible within the scope of the appended claims.

Although features and elements are described above in particular combinations, each feature or element can be used alone without the other features and elements or in various combinations with or without other features and elements. In the above, a processor or processing unit may include, by way of example, a general purpose processor, a special purpose processor, a conventional processor, a digital signal processor (DSP), a plurality of microprocessors, one or more microprocessors in association with a DSP core, and any other type of integrated circuit (IC).

Further, although applications of the positioning device have been described with reference to surveying or agricultural systems, the invention may be applicable to any systems or instruments in which a positioning device according to any one of the above described embodiments may be integrated.

Further, it will be appreciated that an operator may use a plurality of positioning devices in accordance with any of the above described embodiments, wherein some of the positioning devices may be used in the base mode and one or more positioning devices may be used in the rover mode. Positioning devices in accordance with any one of the above described embodiments provide for a use in a proprietary mode in which an operator has the possibility of installing a number of positioning devices at known positions to operate in the base mode and performing measurements using a number of positioning devices in the rover mode. Positioning devices in accordance with any one of the above described embodiments may also be used without a network of positioning devices or other sources transmitting complementary data, as available from any other system providers.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A positioning device comprising:
a global navigation satellite system (GNSS) receiving unit configured to receive GNSS signals from one or more satellites;
a communication antenna configured to receive and/or transmit complementary data; and
a communication module configured to be separately, reversibly connected to each of the GNSS receiving unit and the communication antenna, such that the communication module communicatively and mechanically couples the GNSS receiving unit with the communication antenna through the communication module,
the communication module further configured to, provide, to the GNSS receiving unit, complementary data received at the communication antenna, and/or provide, to the communication antenna, complementary data generated at the GNSS receiving unit.

2. The positioning device of claim 1, wherein the GNSS receiving unit is configured to compute a position based on the received GNSS signals and the complementary data and/or to provide the received GNSS signals and the complementary data for external computation of a position.

3. The positioning device of claim 1, wherein the GNSS receiving unit is configured to generate complementary data based on a known position of said positioning device and the received GNSS signals, the generated complementary data being transferred to the communication module for transmission via the communication antenna.

4. The positioning device of claim 1, wherein the communication antenna is detachable.

5. The positioning device of claim 1, wherein the communication antenna is at least one of a ultra high frequency, UHF, antenna, and a code division multiple access, CDMA, antenna.

6. The positioning device of claim 1, wherein the communication antenna is configured to support frequencies in the 800 or 1900 MHz bands for CDMA communication or for at least one of the ranges 410-430, 430-450, 450-470, and 410-470 MHz for UHF communication.

7. The positioning device of claim 1, wherein the communication antenna directly connects to the communication module via a connector.

8. The positioning device of claim 1, wherein the communication antenna is mountable on a separate geodetic pole and connectable to the communication module via a cable.

9. The positioning device of claim 1, wherein the communication module is configured to support at least one of CDMA, UHF, 3G or 4G functionalities.

10. The positioning device of claim 1, wherein the complementary data includes, in a receiver mode, at least one of differential GNSS correction data, GNSS signals received at a transmitting positioning device, characteristics of the transmitting positioning device and additional correction data computed at the transmitting positioning device and, in a transmitter mode, at least one of differential GNSS correction data, GNSS signals received at the positioning device, characteristics of the positioning device and additional correction data computed by the positioning device.

11. The positioning device of claim 1, further comprising an interface for transfer of data between the communication module and a processing unit of the GNSS receiving unit.

12. The positioning device of claim 1, wherein the communication antenna is arranged to point at a direction opposite to a pointing direction of a GNSS antenna of the GNSS receiving unit.

13. The positioning device of claim 1, wherein the communication module is connectable into a housing of the GNSS receiving unit.

14. The positioning device of claim 1, wherein the communication antenna is arranged within a detachable radio-transparent pole.

15. The positioning device of claim 1, wherein the communication antenna is arranged in a pole having a first end attached to a housing of the GNSS receiving unit or a housing of the communication module.

16. The positioning device of claim 1, wherein the GNSS receiving unit includes a housing comprising a thermally conducting thread for connection of a pole in which the communication antenna is arranged, the thread being in thermal contact with the communication module.

17. The positioning device of claim 1, wherein the communication module is enclosed in a housing including a thermally conductive portion in thermal contact with a transceiver shielding of said communication module.

\* \* \* \* \*